(12) United States Patent
Natarajan et al.

(10) Patent No.: US 8,495,210 B1
(45) Date of Patent: *Jul. 23, 2013

(54) PREDICTIVE PUBLISHING OF INTERNET DIGITAL CONTENT

(75) Inventors: Sandeep Natarajan, Portland, OR (US); Eric Hayes, Tigard, OR (US)

(73) Assignees: Leeward, Inc., Portland, OR (US); Stolowitz Ford Cowger LLP, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,471

(22) Filed: Aug. 6, 2012

Related U.S. Application Data

(63) Continuation of application No. 12/395,324, filed on Feb. 27, 2009, now Pat. No. 8,255,521.

(60) Provisional application No. 61/032,414, filed on Feb. 28, 2008.

(51) Int. Cl.
*G06F 15/173* (2006.01)
*G06F 15/16* (2006.01)

(52) U.S. Cl.
USPC .......................... 709/224; 709/217; 709/219

(58) Field of Classification Search
USPC ....................................................... 709/224
See application file for complete search history.

(56) References Cited

U.S. PATENT DOCUMENTS

| | | | |
|---|---|---|---|
| 5,715,443 A | 2/1998 | Yanagihara | |
| 5,799,304 A * | 8/1998 | Miller | 1/1 |
| 6,014,665 A | 1/2000 | Culliss | |
| 6,182,068 B1 * | 1/2001 | Culliss | 707/721 |
| 7,076,728 B2 * | 7/2006 | Davis et al. | 715/205 |
| 7,370,381 B2 * | 5/2008 | Tuttle et al. | 707/748 |
| 7,801,896 B2 * | 9/2010 | Szabo | 707/739 |
| 2002/0111941 A1 | 8/2002 | Roux | |
| 2004/0034631 A1 * | 2/2004 | Julliard et al. | 707/4 |
| 2006/0050996 A1 * | 3/2006 | King et al. | 382/312 |
| 2007/0067267 A1 * | 3/2007 | Ives | 707/3 |
| 2007/0180058 A1 * | 8/2007 | Wu et al. | 709/219 |

(Continued)

OTHER PUBLICATIONS

Readability Tools; Jun. 2007; Silicon Prairie Software, Version 1.0; 44 pages.

(Continued)

*Primary Examiner* — Richard G Keehn
(74) *Attorney, Agent, or Firm* — Stolowitz Ford Cowger LLP

(57) ABSTRACT

A rich set of data can be acquired by suitable technology, integrated with RSS reader implementations, to better understand the web feed consuming audience. That data can be applied to help publishers better understand their readership. This disclosure is directed to capturing user data, generating predictions on how an article would be received by the readership (preferably before it is published), and automatically creating recommendations for use by an author or web publisher on how the article might be edited or "fine tuned" to achieve greater impact. In one embodiment, we build a profile for each author/publisher over her entire set of published articles. When a new article is written, it is matched against this author profile and recommendations are made.

28 Claims, 6 Drawing Sheets

U.S. PATENT DOCUMENTS

| | | | |
|---|---|---|---|
| 2007/0216651 A1* | 9/2007 | Patel | 345/168 |
| 2007/0250468 A1* | 10/2007 | Pieper | 707/1 |
| 2008/0010337 A1 | 1/2008 | Hayes | |
| 2008/0141117 A1* | 6/2008 | King et al. | 715/238 |
| 2008/0167887 A1* | 7/2008 | Marcken | 705/1 |
| 2008/0313172 A1* | 12/2008 | King et al. | 707/5 |
| 2009/0037268 A1* | 2/2009 | Zaid et al. | 705/14 |
| 2009/0076887 A1* | 3/2009 | Spivack et al. | 705/10 |
| 2009/0112837 A1* | 4/2009 | Modani et al. | 707/5 |
| 2009/0164408 A1* | 6/2009 | Grigorik et al. | 707/1 |
| 2009/0172773 A1* | 7/2009 | Moore | 726/1 |
| 2009/0210369 A1* | 8/2009 | Shao et al. | 706/21 |
| 2010/0030734 A1* | 2/2010 | Chunilal | 707/3 |

OTHER PUBLICATIONS

Vivek Khemka; For Bloggers, Parents, Teachers and You: What Reading Level is Your Content At?; Jul. 15, 2007; 7 pages.

International Search Report and Written Opinion of the International Searching Authority dated Jul. 8, 2008 in PCT/US2007/073068; 9 pages.

* cited by examiner

PREDICTIVE PUBLISHING OF INTERNET DIGITAL CONTENT

RELATED APPLICATIONS

This patent application is a continuation of pending U.S. patent application Ser. No. 12/395,324 filed on Feb. 27, 2009 which claims the benefit under 35 U.S.C. §119(e) of U.S. provisional application 61/032,414, filed Feb. 28, 2008, all of which are herein incorporated by reference in their entirety for all purposes.

TECHNICAL FIELD

This invention pertains to computer-based methods and apparatus for distributing or "publishing" selected digital content to users via Internet-based "feeds."

BACKGROUND OF THE INVENTION

RSS (Rich Site Summary) is just one example of a format for delivering regularly changing web content to user. Many news-related sites, weblogs and other online publishers syndicate their content as an "RSS Feed" to whoever wants it. RSS and similar systems are beneficial for many people who regularly use the web. It allows one to easily stay informed by retrieving the latest content from selected sites of interest. Users save time and effort because they need not visit each web site individually. Also a measure of privacy is provided, as an RSS feed user need not join each site's email newsletter. Not surprisingly, the number and variety of sites offering RSS and other types of feeds is growing rapidly. RSS (and its various embodiments) accordingly has become a quick, easy and powerful communication tool to disseminate information.

Present technology is limited however in that the publisher or web site operator cannot "target" its feeds in a meaningful way. Rather, the feed simply goes out to anyone and everyone who subscribes to it. The need remains for improvements that would help the publishers predict how an article is going to be received by the audience. In a similar vein, it would assist the publisher to have information or recommendations on how a specific article can be fine tuned prior to publication in order to achieve greater impact. We use the term "article" broadly in this application to refer to any digital content item broadcast to subscribers via a web feed system such as RSS, including without limitation text, metadata, audio, video or other media.

Reference is now made to the drawing figures in which like reference numerals refer to like elements. In the following description, certain specific details of programming, software modules, user selections, network transactions, database queries, database structures, etc., are provided by way of illustration and not limitation for a thorough understanding of the invention. However, those skilled in the art will recognize that the invention can be practiced without one or more of the specific details, or with other methods, components, materials, etc.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, standing alone, networked, or in client-server architectures.

RSS has recently achieved mass adoption by knowledge workers and information technologists. RSS "readers" are quite popular among bloggers. However, to our knowledge there has been no commercial software that helps the publishers predict how an article is going to be received by the audience. Most of the current software products only provide a limited report on the click stream activity on published articles.

In one aspect of the current invention, the content of an article is analyzed using a set of readability tests and the results are compared to previously recorded user reading behaviors on similar articles. The current invention in some embodiments provides predictions for unpublished articles and offers recommendations to fine tune the articles for better reception by the readership.

Figure 1:
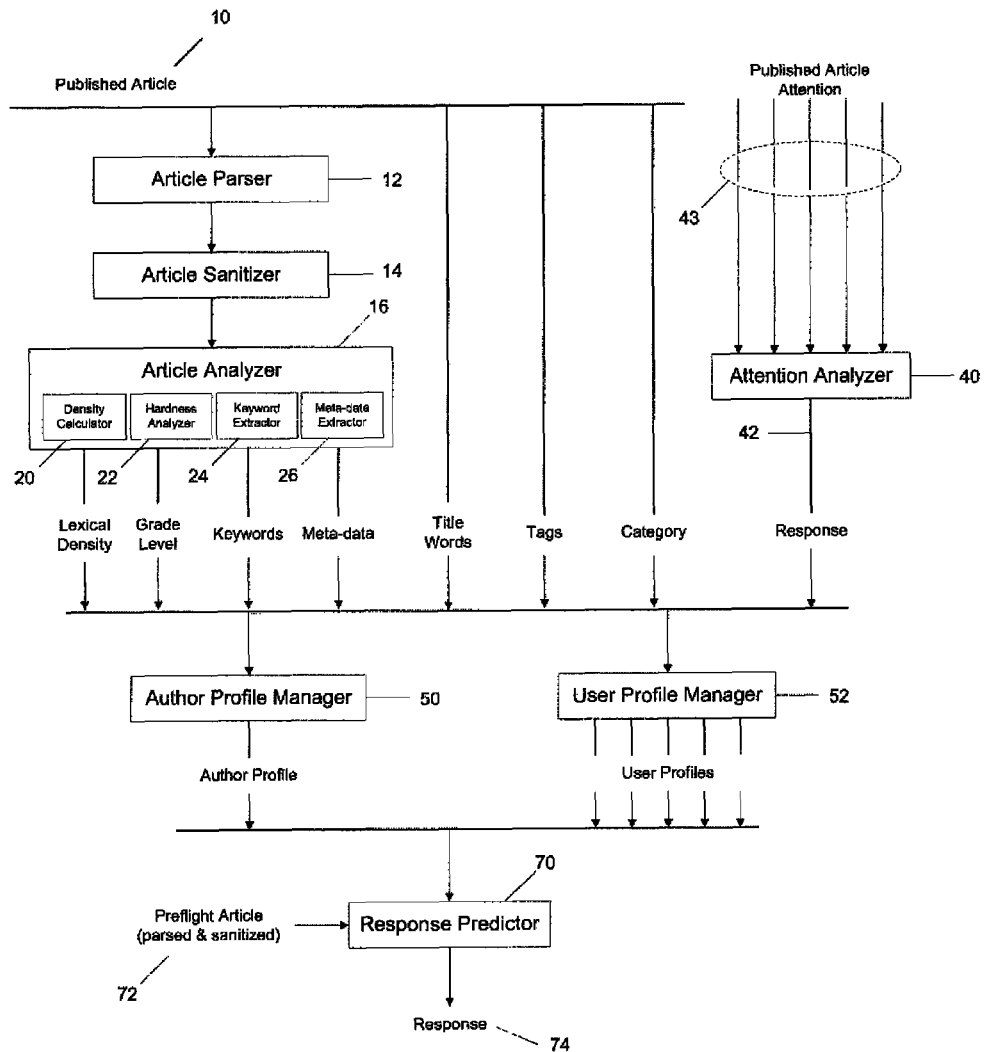
FIG. 1 is a simplified example of a logical design of a system for predicting readership response to an article.

FIG. 1 is a simplified example of a logical design of a system for implementing one embodiment of selected aspects of the present invention. Preferably, such a system would be implemented in software. That is, it would be reflected in instructions executable in one or more processors. The software is stored in computer-readable media, many types of which are well known and need not be enumerated here.

Figure 2A:
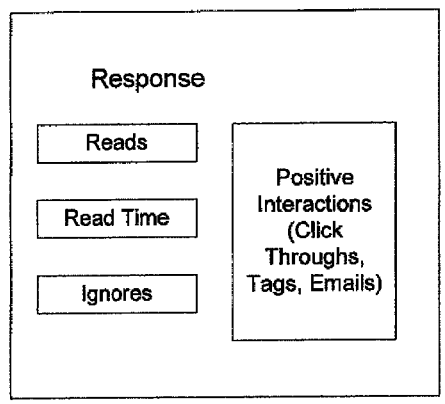
FIGS. 2A-2C show illustrative data structures for storing response data, author profile data, and user profile data, respectively.
Figure 2C:
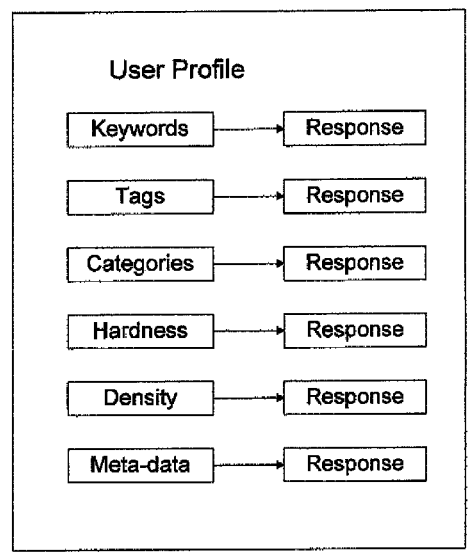
Figure 2B:
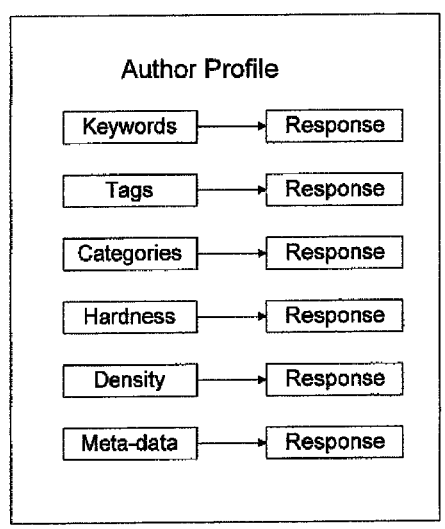

Referring to FIG. 1, articles are tokenized by a text processor and various meta-data are extracted. These meta-data are then processed by an analyzer which performs certain tests on them as further described below. The test results preferably are recorded in a corresponding author profile such as that illustrated in FIG. 2B.

The attention analyzer (40) uses AttentionStream—discussed below—generated by user activity to build a user profile. This user profile in conjunction with author profile can be used by the response predictor to make predictions for an unpublished article.

Text Processor

The text processor in one presently preferred embodiment consists of two components, namely article parser 12 and article sanitizer 14. The article parser 12 extracts individual tokens from an input article 10. Tokens are a sequence of letters and/or numbers separated by delimiters like space, comma, question mark, exclamation etc. The article sanitizer 14 does basic information retrieval operations on the tokens, including but not limited to "case folding," stop word removal and stemming.

Case folding involves converting all the upper case letters to lower case. Stop word removal involves pruning words like "a," "is," "the" etc., that do not alter the meaning of the article when removed. Stemming involves removing the suffixes from words and converting them to their root forms. In one embodiment of the invention, the "Snowball Stemmer" is used to stem the words. Snowball is a freely available (BSD) open source string processing language designed for creating stemming algorithms for use in information retrieval projects.

Article Analyzer

The article analyzer 16 in one embodiment takes the tokenized articles and applies a set of readability tests to compute the "hardness" or difficulty of the article. The results of these tests are stored in the author profile described below. The readability tests included in the current embodiment of the invention are as follows. Other readability tests applying similar considerations should be considered equivalents of those shown below. In addition, other readability tests besides those shown here may be included in a useful article analyzer within the scope of the present invention. Conversely, one or more tests may be omitted in some alternative embodiments without departing from the scope and spirit of the present disclosure.

Density Calculator

The density calculator 20 in FIG. 1 computes a lexical density of the article which provides one measure of readability of the text as a ratio of content (lexical) words over total words. Texts with lower lexical density tend to be easily understood. This is typically a value between 0 and 1. It is calculated as:

$$\text{Lexical Density} = \frac{\text{Number of unique words}}{\text{Total number of words}}$$

Hardness Analyzer

The hardness analyzer 22 computes a "readability" of the text indicated as a factor of the number of years of education a student in the United States would need to understand the text. In one embodiment of the invention, the hardness is calculated as a SMOG index. SMOG is a widely known readability test developed by G. Harry McLaughlin. SMOG is known to have an outstandingly high 0.985 correlation with the grades of readers. The SMOG index is calculated as:

$$SMOG \text{ Index} = \sqrt{\left(\text{number of complex words} \cdot \left(\frac{30}{\text{total number of sentences}}\right)\right)} + 3$$

In calculating the SMOG index, words that have 3 or more syllables are considered complex. The following approximations may be used to identify the number of syllables in a word:

Each occurrence of a vowel or the letter 'y' is considered a syllable.

Adjacent vowels are considered 1 syllable.

When 'e' appears at the end of a word, it is not considered a syllable.

Words with no vowels are assumed to have 1 syllable.

Keyword Extractor

The keyword extractor 24 captures words that are representative of the article 10. In one embodiment of the invention, the keywords are identified using weights computed using their statistical frequency. The weight preferably is computed as a factor of term-frequency and inverse document frequency (tf-idf). In computing tf-idf, both local and global frequencies are taken into account. In one embodiment of the invention, the word weight is calculated as:

Ward weight $w = tf \cdot idf$ $$tf = \log_{10}\left(\frac{1 + TotalCount}{1 + TotalCount - TitleCount}\right) + \log_{10}\left(\frac{1 + TotalCount}{1 + TotalCount - CategoryCount}\right) + \log_{10}\left(\frac{1 + TotalCount}{1 + TotalCount - TagCount}\right)$$

$$idf = \log_{10}\left(\frac{1 + ArticleCount}{1 + ArticleCount - ArticleTitleCount}\right) + \log_{10}\left(\frac{1 + ArticleCount}{1 + ArticleCount - ArticleCategoryCount}\right) + \log_{10}\left(\frac{1 + ArticleCount}{1 + ArticleCount - TagCount}\right)$$

In the above formula:

TotalCount is the frequency of the token in the entire article.

TitleCount is the frequency of the token in the title of the given article.

CategoryCount is the frequency of the token in the category field of the given article.

TagCount is the frequency of the token in the tag field of the given article.

ArticleCount is the frequency of the token across all the articles in the database.

ArticleTitleCount is the frequency of the token in the title across all the articles in the database.

ArticleCategoryCount is the frequency of the token in the category field across all the articles in the database.

ArticleTagCount is the frequency of the token in the tag field across all the articles in the database.

Metadata Extractor

Another component of a preferred article analyzer 16 is a metadata extractor 26. Apart from analyzing the article 10 for hardness and capturing keywords, the article analyzer may create other meta-data about the article. In one embodiment of the invention the following data pertaining to the "literature" of the article is also captured, for example:

Number of tokens in the article

Number of unique tokens

Average length of the tokens

Average number of syllables per token

Number of complex tokens (3 syllables or more)

Number of sentences

The metadata extractor 26 may also capture data that are not specific to the literature of the article, which can include, for example:
Number of outgoing links
Number of embedded images/multimedia
Article category
Tags in the article Attention Analyzer Referring again to FIG. 1, the attention analyzer 40 inspects the data recorded by an attention stream. Gathering user attention data is further described below with reference to FIG. 5. Essentially, this component analyzes the nature of response from the readership. Reference 43 indicates response data or indicia from a plurality of users.

In one embodiment, the attention stream contains the following types of user actions: adding a new feed, removing a feed, reading an article, flagging an article, tagging an article, emailing an article, clicking through an article, or deleting an article. The preferred embodiment also collects metadata regarding the user action, such as the link to which the user clicked-through, the label the user assigned to the article, the client device used to interact with the feeds, the number of times the article has been read, the number of times an article has remained unread, and any rating assigned to the article.

A variable called "Response" (42) may be computed as a ratio of the number of "positive interactions" over the total number of interactions over all users. The positive interactions may include, for example, reads with greater than average user read time, click-throughs, emails (sending article to friends/colleagues), tags and flags. In one embodiment of the invention, the response may be transposed to a scale of 1 to 10 where 1 represents negative interaction and 10 represents positive interaction.

Profile Managers

The data extracted by the article analyzer 16 and the attention analyzer 40 are used to build profiles for both the authors and the users. The profiles preferably are recorded as a tuple of item-response values. See FIGS. 2B and 2C. In one embodiment of the invention the profile comprises the following list of values:
<Keywords-Responses>
<Tags-Responses>
<Categories-Responses>
<Hard ness-Responses>
<Density-Responses>
<Metadata-Responses>

Response Predictor

Figure 4:
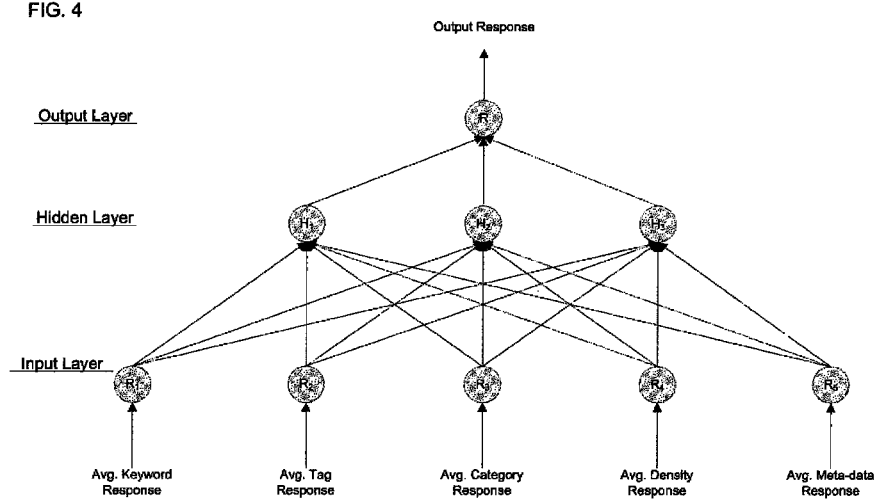
FIG. 4 is a simplified architectural diagram of an example of an output response predictor neural network.
Figure 4:
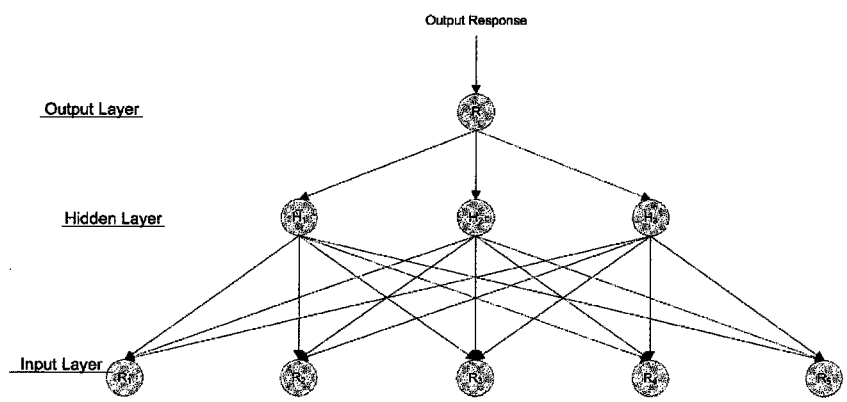

The response predictor 70 takes a preflight article 72 and predicts a probable response 74 from the readership based on the responses to past articles as explained above. In one embodiment of the invention, the response predictor may be implemented as a software based feed-forward back-propagation neural network. The neural network in one example comprises 1 input layer, 1 output layer and 1 hidden layer. See FIG. 4.

The input to the neural network is the average user response on the individual attributes of an article, which in one embodiment of the invention, includes author, tag, category, keywords, hardness and density. The output of the network, in one embodiment of the invention, is a value between 1 and 10 where 1 indicates negative response, 10 indicates positive response and 5 indicates a neutral response. In one embodiment of the system all 3 layers (input, output and hidden) use a sigmoid transfer function. The output layer transposes the sigmoid function to a scale of 1 to 10.

The neural network in one embodiment is incrementally trained using the attention stream data for all users over all the articles published by the specified author. For each item in the Attention Stream the training example consists of a set of <meta-data, response> pairs, where meta-data includes author, tag, category, keywords, hardness and density. The response may be a numeric value, for example scaled between 1 and 10.

Reports

Figure 3A:
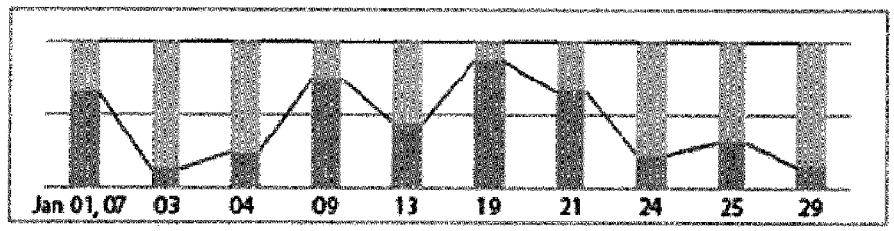
FIGS. 3A-3C are graphs showing examples of article data

In one embodiment of the invention, the publisher is provided reports on the user response to articles published in the past. In the one embodiment of the invention, the author is shown reports on user interactions with each individual article that the author has published on a timeline of publish dates. The number of interactions may be normalized and the positive interactions are distinguished from the negative interactions. This can be presented in tabular, graph or any convenient format, one example of which is shown as FIG. 3A in the drawings.

Hardness Report

Figure 3B:
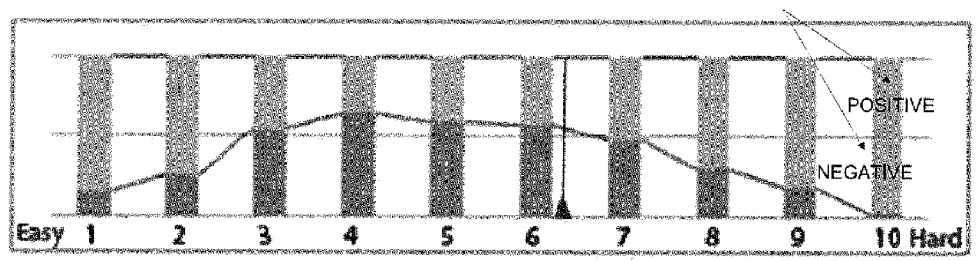

In one embodiment of the invention, the author or publisher is provided a report on user interaction with articles based on their hardness. The report may comprise a histogram of interactions on articles sorted based on the hardness of the articles. An example is shown by way of illustration and not limitation in FIG. 3B. The preflight article is plotted on this graph to show how it might perform based on the performance of previous articles.

Length

Figure 3C:
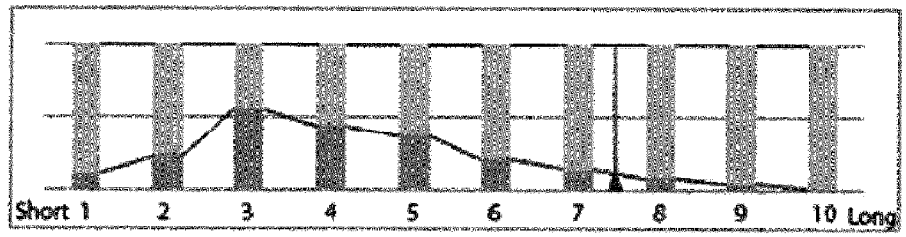

In the one embodiment of the invention, the preflight article is plotted on a histogram of user interactions arranged based on the length of the articles. The length of the article is transposed to a numeric value between 1 and 10 where 1 represents shorter articles and 10 represents longer articles. An example is shown by way of illustration and not limitation in FIG. 3C.

Email Applications

Email and RSS are two closely related paradigms that are used for different purposes. Both Email and RSS support an overlapping set of meta-data (author, title, body etc) and user-actions (mark-as-read, mark-as-unread, flag, delete etc). Some RSS readers can be integrated with certain email clients. As a result, some of the methods described herein to do predictive publishing and prioritization of RSS content can also be applied to Email messages.

In spite of their inherent similarities these paradigms also exhibit some differences which could be leveraged to build more accurate algorithms for one or the other. Two of those differences are discussed here. The first differentiating factor is the communication mechanism. In email, communication between the primary sender and primary receiver takes place as a chain of response messages, while in RSS interaction between the publisher and reader typically happens through comments on feeds.

Another differentiating factor is context information. Email provides context on every message depending on where the receiver's email address appears in the message (to, cc and bcc). This information acts as a cue to the priority of the message. RSS lacks any such information.

Another aspect of the present invention leverages AttentionStream to capture user activities and enable predictive publishing and prioritization of Email in addition to RSS.

Message Chains

In one embodiment of the invention, the information present in the message chain is captured as an attribute of the email (article). The attribute can take on the values: new and chain. For each value a corresponding response 42 is computed based on user actions.

Context Information

In one embodiment of the invention, context information is leveraged by recording an attribute for context. The values that it can take are: to, cc and bcc. Each of these context values have a corresponding response 42 associated with it which is computed from the attention stream.

These <message-chain,responses> and <context,responses> values are input to the Response Predictor 70.

User Attention Streams

In an embodiment, an RSS reader ranks articles and RSS feeds based on monitoring user interactions with each article. In an enterprise version, ranking can reflect the interactions of multiple users with RSS feeds and articles. Monitored user interactions can include reading an article, tagging, forwarding, emailing and the like. These interactions provide the data comprising user "attention streams."

Ranking in general helps the user to automatically order his/her feeds from most important to least important by automatically recording the amount of "attention" the user has given to the feed. "Attention" in this context is reflected by user interactions, for example, the amount of time a user spends reading a given feed/article, and other actions taken by the user such as forwarding an article, "starring" or otherwise marking it for later reference, printing it, etc. Priority helps the user by predicting which feed/article he/she is most likely to read next based on his/her past behavior.

Figure 5:
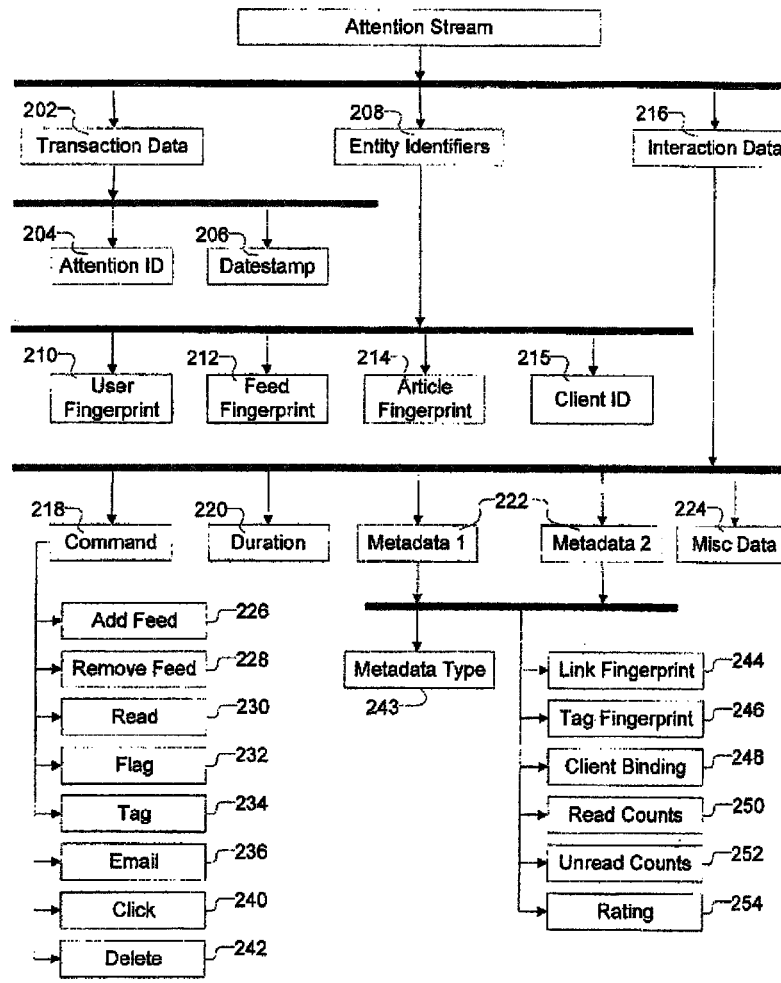
FIG. 5 illustrates one example of a scheme to capture and store various types of user attention data.

Referring now to FIG. 5, it illustrates one example of a scheme to capture and store various types of user attention data. The technology described below performs at least three main functions: (1) it collects and processes articles from one or more RSS feeds; (2) it ranks articles or feeds in relation to each other to reflect relative importance to the user, and (3) it monitors user interaction with the articles and feeds, and dynamically recalculates the rankings. In one embodiment, aspects of the invention can be implemented into a software "reader" application that executes on the user's PC, PDA, cell phone or the like. We refer to such devices as a "client." We use the term "article" herein and in the claims very broadly to include all types of content or media that may be transmitted by a feed over a network. So, for example, an "article" may be a video clip. That said, some of the methods disclosed herein require at least a minimum of textual metadata as explained below.

In an embodiment, for example an enterprise version of this technology, adds to steps (2) and (3) by calculating the ranking of a feed or article as a function of multiple users' interactions with that specific feed or article, as further explained below. Users can choose to display the processed articles on a client device by a content-based rank, a source-based rank, or a schedule-based rank. The content-based rank is determined by how often the user interacted with other articles with similar content to the article being ranked. The source-based rank may be determined by how often the user interacted with other articles from the same RSS feed as the article being ranked. The schedule-based rank may be determined by what feeds the user is most likely to read on a certain day and at a certain time.

Processing Articles

An article in an RSS feed travels from an information provider via a network to the aggregator component [102] of the software. This aggregator component processes the feed containing the article, processes the article, and tokenizes the article. The feed processing component [104] collects information regarding the source of the feed and the time at which the feed's new article arrived. The component then stores the updated feed information in the feed store [110] and the feed attention store [112]. The preferred embodiment of the feed store [110] contains a unique identifier for every feed the user currently subscribes to or has subscribed to in the past, and the number of articles each feed has provided to the software. The preferred embodiment of the feed attention store [112] contains statistics on user attention paid to each feed, as well as the time at which the feed was last updated with a new article.

One preferred embodiment of the article processing component [106] first reduces each word in the article's content to its root form, generally by removing suffixes and plural forms. The processing component also identifies and removes trivial words from the article. Expected trivial words include "the," "at," and "is." In one embodiment, the component identifies trivial words by determining which words occur most frequently across the articles processed by the software. The frequency of each word processed by the software is held in a word store [114], further described below.

A presently preferred embodiment of the word store [114] contains, for each root word collected from previously processed articles, the following data: (1) a unique number id, (2) appearance count, (3) frequency weight, (4) read count, (5) tag count, (6) email count, (7) click-through count, and (8) attention weight. Not all of this data is necessary in all embodiments. The appearance count represents the number of times a variation of the root word has appeared in an article's content. Note, an article's content includes its title. The frequency weight is a normalized value between zero and one, representing how often variations of the root word appeared in articles processed by the software.

The read count represents the number of times an article containing a variation of the root was read by the user. The tag count represents the number of times an article containing a variation of the root was labeled by the user. The email count represents the number of times an article from the publisher was emailed by the user. The click-through count represents the number of times the user "clicked-through" an article. A user clicks-through an article if she follows a link presented in the article to another HTML page, or follows the article to the main web page distributing the article.

To find the most frequently used words, the article processing component may increment the appearance count and recalculates the frequency weight of each root word in the article. If a root in the article is not already in the word store, the root is added to store. In one embodiment, a word with a frequency weight over 0.7 is considered trivial, and is discarded from the article. An alternative embodiment can identify trivial words in an article by comparing that article to a list of pre-determined trivial words.

The article processing component also processes the metadata associated with each article. In one embodiment, the component extracts the publisher tag, category tag and author tag, and keeps track of them in the publisher store [116], category store [118], and author store [120], respectively. Other metadata can be processed in similar fashion.

One embodiment of the publisher store [116] contains, for each publisher processed by the software, the following data: (1) a unique publisher identifier, (2) the publisher name, (3) appearance count, (4) frequency weight, (5) read count, (6)

tag count, (7) email count, (8) click-through count, and (9) attention weight. "Publisher" refers to an entity responsible for making a resource or article available. Examples of a publisher include a person, an organization, or a service. It is not synonymous with a feed, as one publisher may provide multiple feeds.

One embodiment of the category store [118] contains, for each category processed by the software, the following data: (1) a unique category identifier, (2) category name, (3) appearance count, (4) frequency weight, (5) read count, (6) tag count, (7) email count, (8) click-through count, and (9) attention weight. The preferred embodiment of the author store [120] contains, for each author of an article processed by the software: (1) a unique author identifier, (2) author name, (3) appearance count, (4) frequency weight, (5) read count, (6) tag count, (7) email count, (8) click-through count, and (9) attention weight. The unique metadata identifiers (publisher, category and author) preferably are numeric identifiers ("number id").

Next, the article tokenizer component replaces each remaining word (those not stricken) in the article with the word's corresponding unique number id from the word store [114]. In addition, the article tokenizer replaces each element (field) of metadata with the corresponding unique number id associated with that element of metadata in the publisher store [116], category store [118], or author store [120]. This "tokenized" article is then stored in the article store [122]. The preferred embodiment of the article store [122] contains an id for each processed article, an id for the source feed of the article, and the tokenized article, where the tokenized article comprises numbers representing each piece of metadata and each non-trivial word in the content. (The id for the source feed is the same as the that stored in the feed store [110] described above.)

Monitoring User Attention—Attention Stream

Articles and feeds can be ranked based on how much attention the user has paid to similar articles and feeds in the past. The user's attention serves as a proxy or an indicator of how important the content of an article is to the user. By ranking the articles based on the previously collected user attention information, the software will be able to identify the articles that the user would be most interested in reading.

The software in one embodiment monitors user attention and dynamically adjusts the article and feed rankings as a function of the user attention. As shown in FIG. 1, the attention analyzer component collects user attention data; this may come from a reader client interface. Each time the user interacts with an article or feed displayed to the user on a client device, the software collects data regarding the interaction.

In one embodiment, the attention analyzer collects three main types of data for each user interaction: transactional data, identity data, and interaction data. Referring now to FIG. 5, by way of illustration and not limitation, the transactional data [202] preferably includes a unique id for the interaction [204] and a date-stamp [206]. The date-stamp includes the day and time of the interaction. The identity data collected includes a user id or "fingerprint" [210], feed id [212], article id [214], and client device id [215]. The interaction data [216] includes the nature of the interaction ("command") [218], and the duration of that interaction [220], as well as additional metadata [222] and data [224] regarding the interaction.

In the preferred embodiment, the software monitors the following types of user actions: adding a new feed [226], removing a feed [228], reading an article [230], flagging an article [232], tagging an article [234], emailing an article [236], clicking through an article [240], or deleting an article [242]. The preferred embodiment also collects metadata regarding the user action, such as the link to which the user clicked-through [244], the label the user assigned to the article [246], the client device used to interact with the feeds [248], the number of times the article has been read [250], the number of times an article has remained unread [252], and any rating assigned to the article [254].

In an embodiment, a user "reads" an article when she clicks the article title to open a complete version of the article. The complete article may be stored on the user's computer (or other client device), or on the web server distributing the article. The reading duration time ends when the user clicks on another article or closes the software application.

Figure 6:
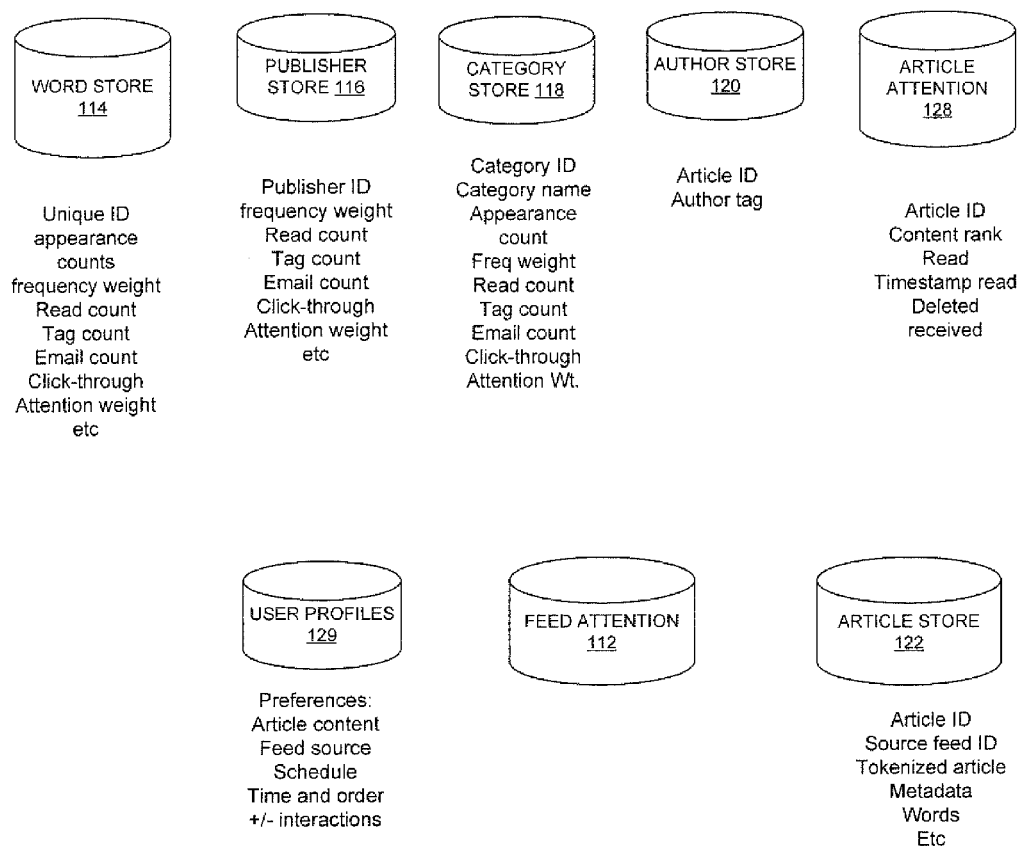
FIG. 6 is an illustration of a conceptual data storage scheme.

Referring now to FIG. 6, in one embodiment, after collecting the user attention data, the attention analyzer in one embodiment updates a word store [114], publisher store [116], category store [118], author store [120], article attention store [128], and feed attention store [112] to reflect the attention paid by the user. For example, each time the user reads an article, the read count for the feed containing the article is incremented in the feed attention store [112]; the read count for each metadata element associated with the article is incremented in the publisher store [116], category store [118], and author store [120] (and or other metadata element stores); and the read count for each non-trivial word in the content of the article is incremented in the word store [114]. In addition, the fields in the article attention store [128] and user profile [129] are modified appropriately.

In one embodiment, the article attention store [128] contains, for each processed article: an article id, the content-based rank, whether or not the article has been read, when the article was read, whether or not the article has been deleted, and when the article was received from the RSS feed. In an embodiment, the user profile contains the user preferences for article content, feed source, and schedule. The profile may include the user's time and order preferences, source preferences, and article content preferences. The user profile also contains a report of the positive and negative user interactions with an article or feed. Positive user interactions may include tagging or emailing an article. Negative user interactions may include deleting an article. User preferences may be inferred from the stored data and processes described above, based on user actions.

Once the data stores have been updated, the article analyzer component [130] can re-calculate the content-based rank for each displayed article [128]. And the feed analyzer component [132] can re-calculate the source-based rank and the schedule-based rank for each displayed feed.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims.

The scope of the present invention should, therefore, be determined only by the following claims.

The invention claimed is:

1. A computer-implemented method comprising:
accessing a list of individual subscribers to an Internet digital content feed service, the listed subscribers together defining a subscriber audience, and each subscriber on the list having an associated subscriber profile;
selecting an article to publish to the subscriber audience based on the subscriber profiles;
publishing the selected article to the subscriber audience via the Internet digital content feed service;
analyzing the selected article to generate corresponding article information;
storing the article information in a data store in association with an identifier of a corresponding author of the article;
tracking individual subscriber actions associated with the selected article to form attention data, wherein tracking includes determining whether a status identifier associated with the selected article indicates that the article is unread;
analyzing the attention data to form an indication of each of the one or more individual subscribers' response to the selected article;
storing the indicia of each of the one or more individual subscribers' responses to the selected article; and
using the stored article information together with the corresponding indicia of attention data, to predict a response of the one or more of the individual subscribers of the subscriber audience to a new, unpublished article.

2. A method according to claim 1, further comprising editing one or more articles for publication to the subscriber audience based on the article information or the indicia of the one or more individual subscribers' responses, or combinations thereof.

3. A method according to claim 1 and further wherein the attention data comprises indicia of the one or more individual subscribers interacting with the selected article in one or more of the following ways, namely, reading the article, flagging the article, tagging the article, emailing the article, clicking through a link in the article, or deleting the article.

4. A method according to claim 1, wherein forming the attention data includes creating metadata responsive to the individual subscribers' actions, including assigning a label or category to the selected article.

5. A method according to claim 1, wherein attention data comprises metadata regarding the one or more individual subscribers' actions, including a number of times the selected article has been read by the one or more individual subscribers.

6. A method according to claim 1, wherein attention data comprises metadata regarding the one or more individual subscribers' actions, including an amount of time spent by the one or more individual subscribers reading the selected article, as reflected by an amount of time the selected article has been displayed by a reader program.

7. A method according to claim 1, wherein the attention data comprises metadata regarding the one or more individual subscribers' actions, including any rating assigned to the selected article by one or more of the individual subscribers.

8. A method according to claim 1 wherein, said analyzing the selected article comprises determining a readability metric for comparison of readability among articles.

9. A method according to claim 8, wherein the readability metric of the selected article comprises at least one of a lexical density metric and a SMOG index.

10. A method according to claim 8, wherein analyzing the selected article includes determining a readability metric of lexical density based at least in part on determining a ratio of content words divided by a total number of words of the selected article.

11. A method according to claim 8, wherein the readability metric is based at least in part on determining a ratio of a number of unique words divided by a total number of words in the selected article.

12. A method according to claim 8, wherein analyzing the selected article includes determining a readability metric indicated as a corresponding number of years of education for a typical student to understand the selected article.

13. A method according to claim 8, wherein the Internet digital content feed service comprises at least one of an RSS feed and a short message feed service.

14. A computer-implemented method of characterizing an audience of subscribers to a digital content feed service to support selection or editing of preflight articles, the method comprising:
selecting a plurality of articles to publish to the audience of subscribers based on one or more subscriber profiles;
publishing the plurality of articles to the subscriber audience via the feed service;
analyzing each of the published articles to generate article information;
storing the generated article information for each published article in a data store in association with an identifier of a corresponding author;
tracking individual subscriber actions associated with each of the published articles to acquire attention data, wherein tracking includes identifying if an individual subscriber leaves one or more of the published articles "unread";
analyzing the acquired attention data to form an indication of each subscriber's response to each of the published articles;
storing the indicia of each subscriber's response to support correlation of subscriber attention to the stored article information; and
building profiles based on the stored article information and the attention analyzer.

15. The method of claim 14 wherein the digital content feed service is an Internet content feed service.

16. The method of claim 15 wherein the Internet content feed service comprises an RSS feed.

17. The method of claim 14 wherein the digital content feed service is an internal enterprise content feed service.

18. The method of claim 14 including:
analyzing the attention data to identify a subject of interest to a subscriber; and
updating the corresponding user profile to indicate the subject of interest to the subscriber.

19. The method of claim 14 including:
analyzing subscriber profiles and stored article information to assess a correlation between a subscriber and a particular article.

20. The method of claim 19 including assessing a correlation between two or more subscriber profiles responsive to respective indicia of subjects of interest.

21. The method of claim 20 including communicating to the two or more subscribers corresponding to the two or more subscriber profiles an indication of the correlation assessment based on their respective subjects of interest.

22. The method of claim 19 including acquiring data from a subscriber's reading and content creation data to supplement the subscribers attention profile.

23. The method of claim 22 including acquiring data from one or more of a subscriber's email clients, web browsers, and productivity applications like word processors.

24. The method of claim 19 including deploying the method as a service via the Internet to provide an attention web service.

25. The method of claim 24 including allowing other applications or web services to access attention data created and stored in the attention web service.

26. A computer program product for characterizing an audience of subscribers to a digital content feed service, the computer program product comprising a computer-readable, non-volatile storage medium containing computer program code including code arranged for:
   characterizing a subscriber audience comprising one or more subscribers to the content feed to generate one or more subscriber profiles;
   selecting a plurality of articles to publish to the subscriber audience based on the one or more subscriber profiles;
   publishing the plurality of articles to the subscriber audience via the content feed;
   analyzing each of the published articles to generate article information;
   storing the generated article information for each published article in a data store in association with an identifier of a corresponding author;
   acquiring from remote user reader programs individual subscriber attention data based on action or inaction, or combinations thereof associated with each of the published articles, wherein the action or inaction includes associating a status identifier with at least one of the published articles indicating that the published article is unread;
   analyzing the acquired attention data to form an indication of each subscriber's response to each of the published articles; and
   building a subscriber profile based on the stored article information and the corresponding indication of the subscriber's responses to the published articles.

27. A computer program product according to claim 26 wherein the computer program code is further configured to:
   analyze a new, unpublished article so as to generate second article information responsive to the unpublished article; and
   predict a subscriber's response to the unpublished article based on comparing the subscriber profile to the second article information.

28. A computer program product according to claim 26 wherein the digital content feed service comprises an RSS feed.

* * * * *